(12) United States Patent
Guo (10) Patent No.: US 11,704,555 B2
(45) Date of Patent: Jul. 18, 2023

(54) BATCH NORMALIZATION LAYER FUSION AND QUANTIZATION METHOD FOR MODEL INFERENCE IN AI NEURAL NETWORK ENGINE

(71) Applicant: Baidu USA LLC, Sunnyvale, CA (US)

(72) Inventor: Min Guo, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 1059 days.

(21) Appl. No.: 16/450,716

(22) Filed: Jun. 24, 2019

(65) Prior Publication Data

US 2020/0401884 A1    Dec. 24, 2020

(51) Int. Cl.
| | | |
|---|---|---|
| G06N 3/08 | (2023.01) | |
| G06N 3/04 | (2023.01) | |
| G06N 20/10 | (2019.01) | |
| G06N 3/063 | (2023.01) | |
| G06N 3/048 | (2023.01) | |
| G06N 3/045 | (2023.01) | |

(52) U.S. Cl.
CPC ............... *G06N 3/08* (2013.01); *G06N 3/04* (2013.01); *G06N 3/048* (2023.01); *G06N 3/063* (2013.01); *G06N 20/10* (2019.01); *G06N 3/045* (2023.01)

(58) Field of Classification Search
CPC ........ G06N 20/00; G06N 20/10; G06N 20/20; G06N 3/02; G06N 3/04; G06N 3/0454; G06N 3/0481; G06N 3/063; G06N 3/08; G06N 3/082; G06N 3/084; G06N 3/086; G06N 3/045; G06N 3/048
See application file for complete search history.

(56) References Cited

U.S. PATENT DOCUMENTS

| | | | | |
|---|---|---|---|---|
| 2020/0175334 | A1* | 6/2020 | Zhang | G06F 18/217 |
| 2020/0218982 | A1* | 7/2020 | Annau | G06N 20/00 |
| 2020/0234447 | A1* | 7/2020 | Karmatha | G06V 20/58 |
| 2020/0302288 | A1* | 9/2020 | Ren | G06N 3/0481 |

* cited by examiner

*Primary Examiner* — Shane D Woolwine
(74) *Attorney, Agent, or Firm* — Womble Bond Dickinson (US) LLP (57) ABSTRACT

Batch normalization (BN) layer fusion and quantization method for model inference in artificial intelligence (AI) network engine are disclosed. A method for a neural network (NN) includes merging batch normalization (BN) layer parameters with NN layer parameters and computing merged BN layer and NN layer functions using the merged BN and NN layer parameters. A rectified linear unit (RELU) function can be merged with the BN and NN layer functions.

18 Claims, 11 Drawing Sheets

BATCH NORMALIZATION LAYER FUSION AND QUANTIZATION METHOD FOR MODEL INFERENCE IN AI NEURAL NETWORK ENGINE

FIELD

Embodiments of the invention relate generally to data and computation processing including neural network (NN) hardware and software to improve inference performance. More particularly, embodiments of the invention relate to batch normalization layer fusion and quantization method for model inference in artificial intelligence (AI) network engine.

BACKGROUND

A neural network (NN) is a type of machine learning which models itself after the human brain. For example, a NN receives inputs (vectors) and transforms the inputs using weights or filters through a series of hidden layers made of nodes (neurons). Each node can be connected to nodes in the previous layer to receive inputs, and the last output layer or fully-connected layer can provide a classification or class score. One type of NN popular for classifying images is a convolutional neural network (CNN)—e.g., using the CNN to determine if an input image shows a vehicle. A CNN includes convolution layers of nodes (neurons) that have learnable weights and biases. Each node can receive inputs and perform a dot product (kernel computation) of each input with weights that are summed across the different inputs at each layer. The weighted sum can be fed into another convolution layer of nodes that leads to a differentiable score at an output layer—i.e., raw image pixel inputs on one end to class scores at the output end used to classify the image.

Other layers that can be used in CNN include a batch normalization layer (BN) that normalizes the results of a CNN layer and a rectified linear unit (RELU) layer that provides positive values for the CNN. Typically, a CNN architecture supports integer operations using 8-bit multiply accumulate (MAC) units. As such, implementing the computations for the CNN layer, BN layer, and a RELU layer can be extensive, especially if there are a large number layers and nodes. Furthermore, the results of the computations calculated by MACs at each layer are stored in memory, which have to be retrieved for processing by subsequent layers to perform computations. This retrieval of results from memory can thus degrade the computation efficiency in the CNN. In systems in which classification of input data or images needs to be obtained essentially in real time, e.g., autonomous driving, the processing of computations at each layer needs to be processed efficiently and expeditiously.

BRIEF DESCRIPTION OF THE DRAWINGS

The appended drawings illustrate examples and embodiments and are, therefore, exemplary and not considered to be limiting in scope.

DETAILED DESCRIPTION

The following detailed description provides embodiments and examples of batch normalization (BN) layer fusion and quantization method for model inference in artificial intelligence (AI) network engine. Reference to a neural network (NN) includes any type of neural network including deep neural networks (DNNs) and convolutional neural networks (CNNs) that can be used in an AI network engine. For one example, a NN can be an instance of a machine learning algorithm or process and can be trained to perform a given task such as classifying input data, e.g., input images. Training a NN can involve determining weights and biases for data passing through the NN including determining batch normalization (BN) parameters for inference performance of the NN.

Once trained, a NN can perform a task by computing an output using the parameters, weights and biases at any number of layers to produce activations that lead to determining a classification or score of input data. As such, running or implementing the NN with these parameters, weights and biases that ultimately determine an output (e.g., a class score) can be referred to as inference. In the following embodiments and examples, NN inference can be performed on embedded devices, systems or hardware including integrated circuits, system on a chip (SOC), processors, central processing units (CPUs) or graphical processing units (GPUs).

For one example, a method for a NN includes merging batch normalization (BN) layer parameters with convolutional kernel computation layer (CONV layer) parameters and computing merged BN layer and CONV layer functions using the merged BN and CONV layer parameters. A rectified linear unit (RELU) function can be merged with the merged BN and CONV layer functions to provide positive values. By way of merging at least the BN layer and CONV layer functions, the access and retrieval of data in memory for the merged computation can be in-place thereby accelerating NN inference performance. For example, BN computation can be performed together with CONV kernel computation and thus memory access for data can be minimized resulting in improved computation efficiency.

Reference in the detailed description to "one embodiment" or "one example" means that a particular feature, structure, or characteristic described in conjunction with the embodiment or example can be included in at least one embodiment or example of the disclosure. The appearances of the phrase "in one embodiment" or "in one example" in various places in the detailed description do not necessarily refer to the same embodiment or example.

As set forth herein, various embodiments, examples and aspects will be described with reference to details discussed below, and the accompanying drawings will illustrate various embodiments and examples. The following description and drawings are illustrative and are not to be considered as limiting. Numerous specific details are described to provide a thorough understanding of various embodiments and examples. However, in certain instances, well-known or conventional details are not described to facilitate a concise discussion of the embodiments and examples.

Exemplary Neural Network (NN) Layers and Respective Functions

Figure 1:
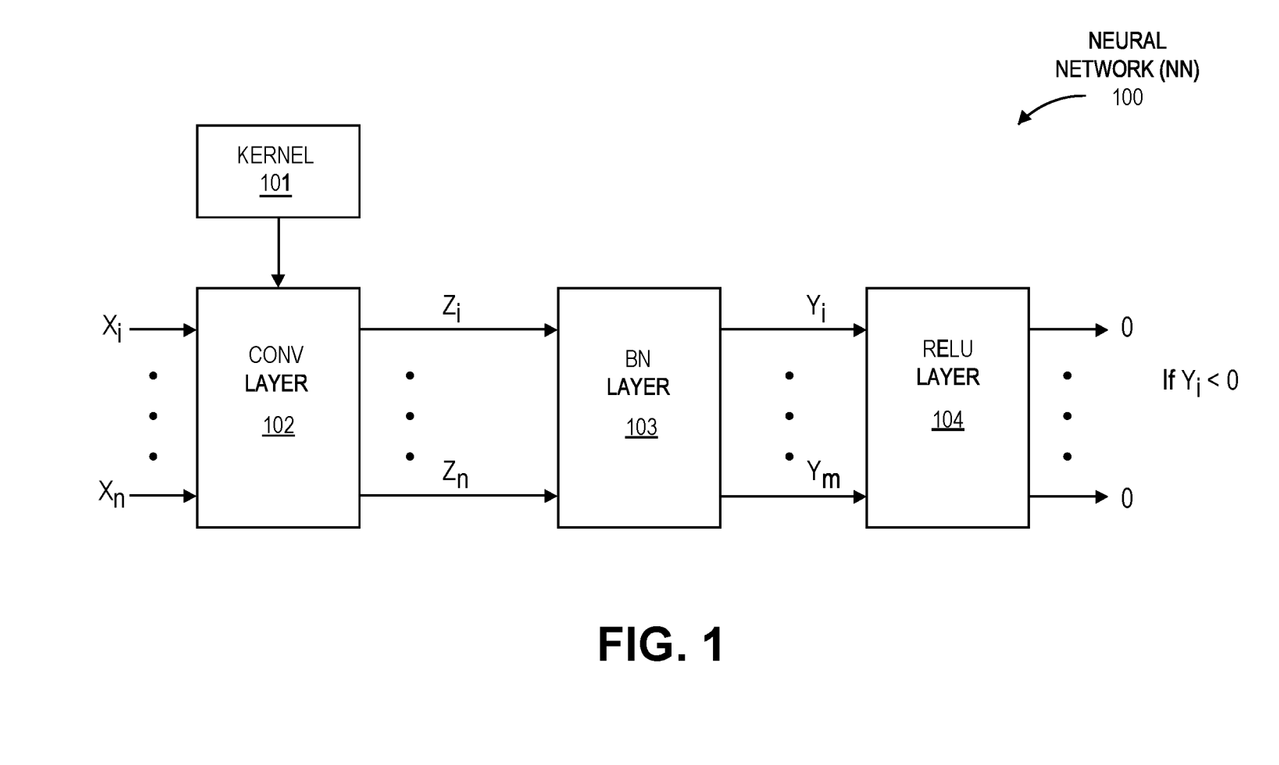
FIG. 1 illustrates one example of a neural network (NN) showing a convolutional layer with a kernel, batch normalization layer, and a rectified linear unit layer.

FIG. 1 illustrates one example of a neural network (NN) 100 having a convolutional (CONV) layer 102 with a kernel 101, batch normalization (BN) layer 103, and a rectified linear unit (RELU) layer 103 that can be used to classify input data, e.g., input images. For purposes of explanation, only three layers 102, 103 and 104 are referred to in NN 100, which are merged, as described below, to improve NN inference performance. The CONV layer 102 performs kernel computations on input data $X_i$ to $X_n$ to generate results $Z_i$ to $Z_n$. The BN layer 103 performs a BN transformation on the results $Z_i$ to $Z_m$ from CONV layer 102 to generate normalized results $Y_i$ to $Y_m$ and RELU layer 104 performs an elementwise activation function such that positive values of $Y_i$ are used.

Kernel Computation Function

Figure 2A:
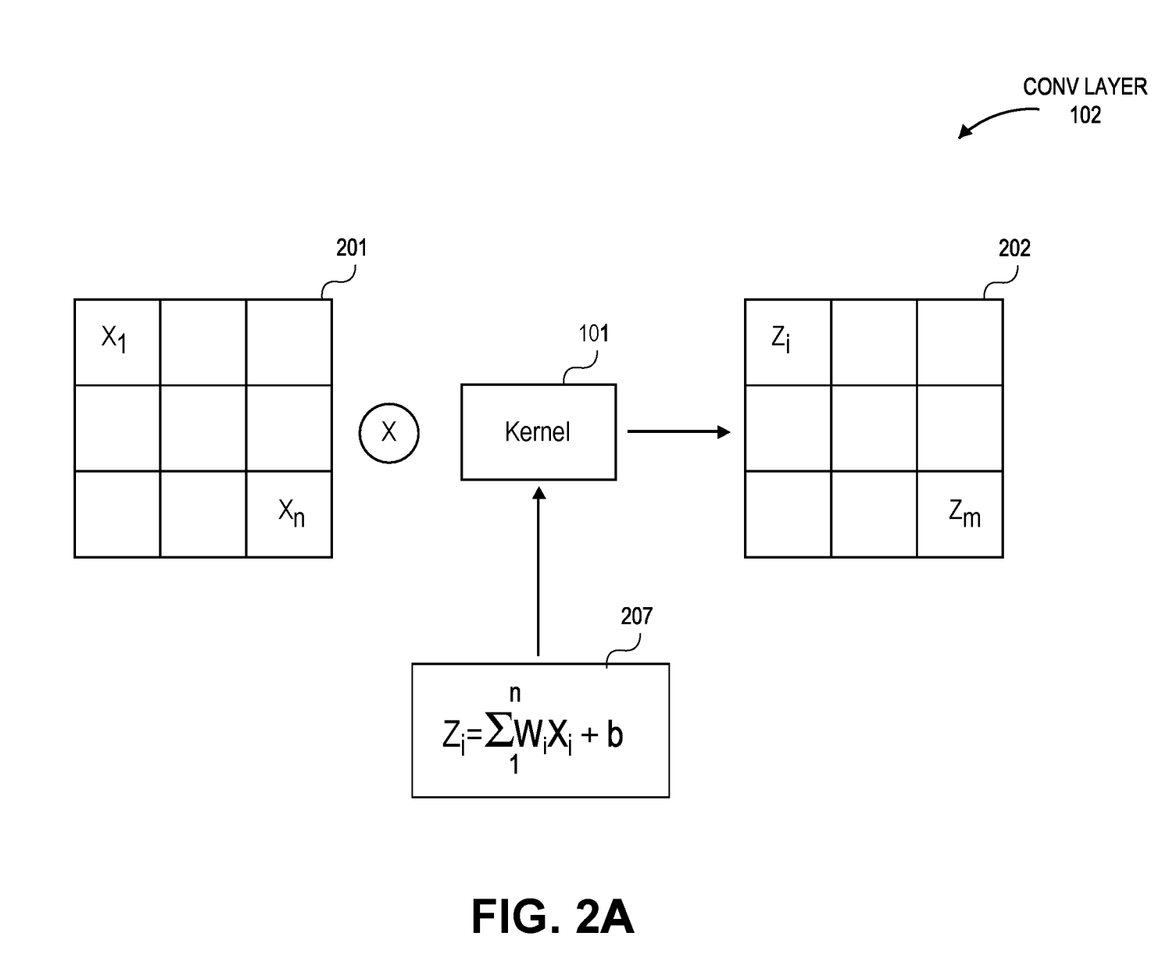
FIG. 2A illustrates one example diagram for a kernel computation of a convolutional layer.

FIG. 2A illustrates one example diagram for a kernel computation 101 of the convolutional (CONV) layer 102. Inputs 201 can provide an array of pixel values of a feature map or an image such as $X_i$ to $X_n$ having a width and height. Inputs 201 can have values for any number of channels including red (R), green (G), and blue (B) channels. CONV layer 102 computes outputs of nodes (neurons) tied to regions of the inputs 201 by computing a dot product summation between weights and the $X_i$ to $X_n$ values plus a bias "b" or offset as shown in Equation 1 below and 207 in FIG. 2A.

$$Z_i = \Sigma_1^n W_i \times X_i + b \quad \text{Equation 1: (Kernel Computation)}$$

The outputs 202 of kernel computation include $Z_i$ to $Z_m$ which can have the same dimensions as inputs 201 to $X_i$ to $X_n$. The outputs $Z_1$ to $Z_m$ are normalized according to a batch normalization transformation as detailed below by the BN layer 103.

Batch Normalization Transform Function

Figure 2B:
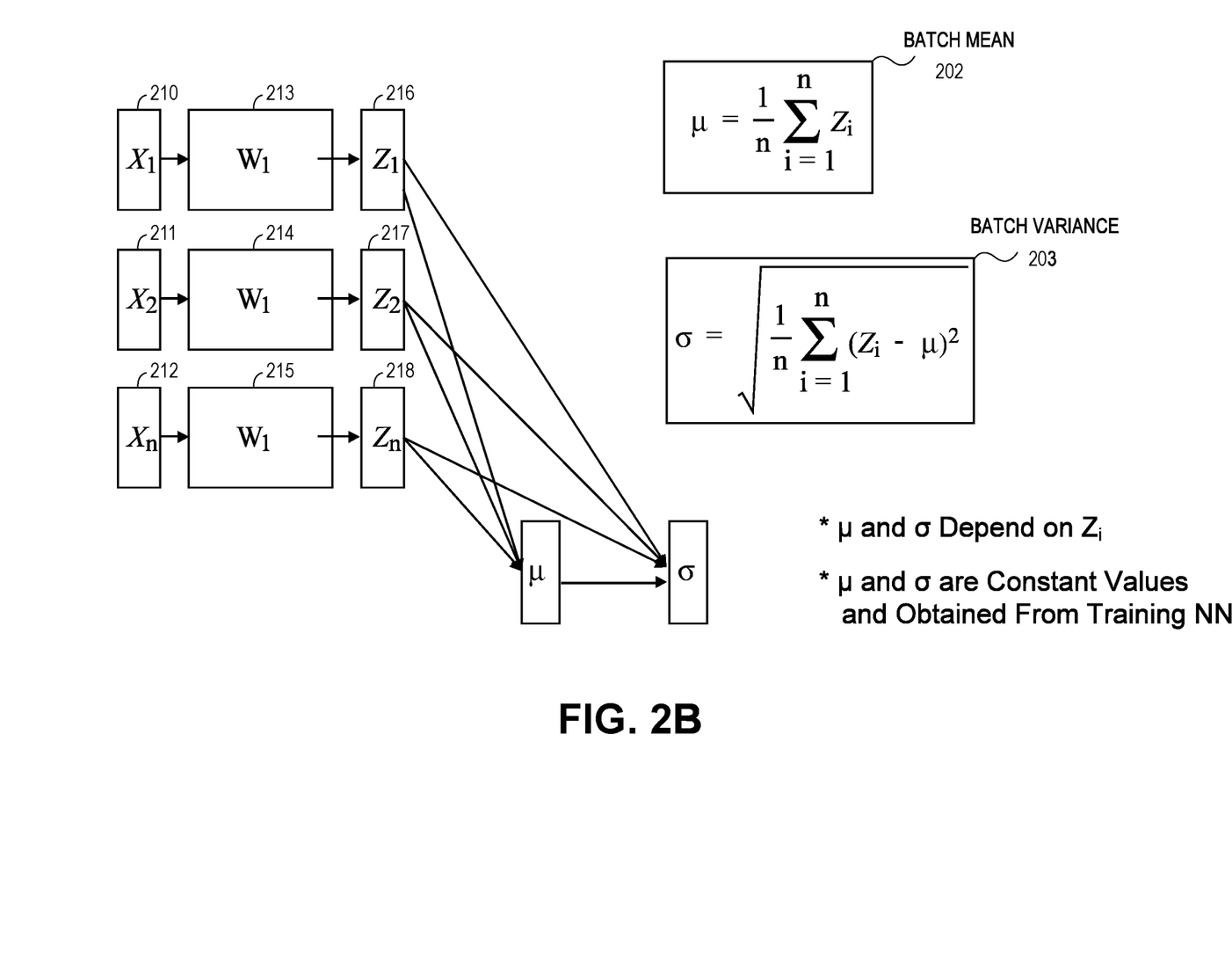
FIG. 2B illustrates one example diagram for computing batch mean and batch variance.
Figure 2C:
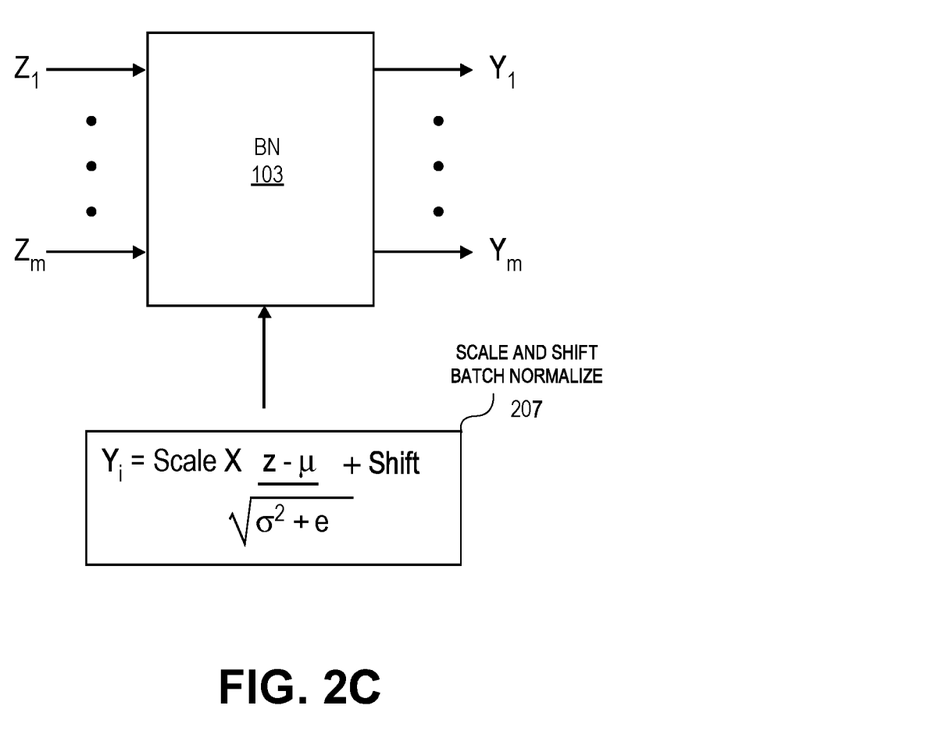
FIG. 2C illustrates one example diagram of a batch normalization layer for transforming the batch normalize with scale and shift parameters.

FIGS. 2B-2C illustrate example diagram for computing batch mean 202, batch variance 203, and batch normalize function 207 using the batch mean 202 and batch variance 203 for a batch normalization (BN) layer 103. For one example, the values for batch mean 202 and batch variance 203 are constant values and derived from training the NN 100. The BN layer 103 can normalize the distribution of the kernel computation outputs $Z_i$ to $Z_m$ by scaling and shifting those outputs such that they have a zero mean and a unit standard deviation to reduce internal covariate shift and accelerate training of the NN.

For example, BN layer 103 performs batch normalization through a normalization step that fixes the means and variances of inputs to a layer. For one example, BN layer 103 can be trained using a mini-batch of inputs having a set of size n. As shown below in Equations 2 and 3 below and FIG. 2B (202, 203), the batch mean and batch variance can be derived as follows:

$$\mu = \frac{1}{n} + \sum_{i=1}^{n} Z_i \text{ (Batch Mean)} \quad \text{Equation 2}$$

$$\sigma = \sqrt{\frac{1}{n}\sum_{i=1}^{n}(Z_i - \mu)^2} \text{ (Batch Variance)} \quad \text{Equation 3}$$

In this example, $\mu$ and $\sigma$ depend on $Z_i$ (kernel computation outputs) can be constant values obtained from training NN 100.

Referring to Equation 4, the kernel computation outputs $\hat{Z}_l$ can be normalized referring to Equation 4. For explanation purposes, $\hat{Z}_l$ is explained for one dimensional, however, $\hat{Z}_l$ can have multiple dimensions common for convolutional layers and each dimension can be normalized respectively.

$$\hat{Z}_i = \frac{z - \mu}{\sqrt{\sigma^2 + \epsilon}} \text{ (Normalize)} \quad \text{Equation 4}$$

$\in$ is added in the denominator of the batch normalize function for numerical stability and is an arbitrarily small constant. The resulting batch mean 202 and batch variance 203 have a zero mean and variance if $\in$ is not taken into account.

Referring to Equation 5 below and FIG. 2C (scale and shift batch normalize 207), to restore representation to NN 100, a transformation of the batch normalize needs to occur, which is as follows:

$$Y_i = \text{Scale} \times \frac{z - \mu}{\sqrt{\sigma^2 + \epsilon}} + \text{Shift (Batch Transform)} \quad \text{Equation 5}$$

The result of the above transform is referred to as the batch transform. The Scale and Shift parameters are learned in the training and optimization process. For one example, Scale and Shift parameters are learned in the optimization or training process. The output of the batch transform can be passed to other NN 100 layers, while the normalized output can remain with the current layer.

Rectified Linear Unit RELU Function

RELU layer 104 performs an elementwise activation function such that positive values of $Y_i$ are used. For one example, RELU layer 104 can perform an activation function such as max(0, y), that is, with respect to NN 100 an RELU layer 104 can perform an activation function such as f(y)=max (0, y), which can be referred to as a ramp function. The output of the RELU layer 104 can have the same dimensions as the outputs of the CONV layer 102 and BN layer 103. For one example, the output of RELU layer 104 can be fed to another layer of NN 100.

Merged Neural Network (NN) Layers and Functions

Figure 3A:
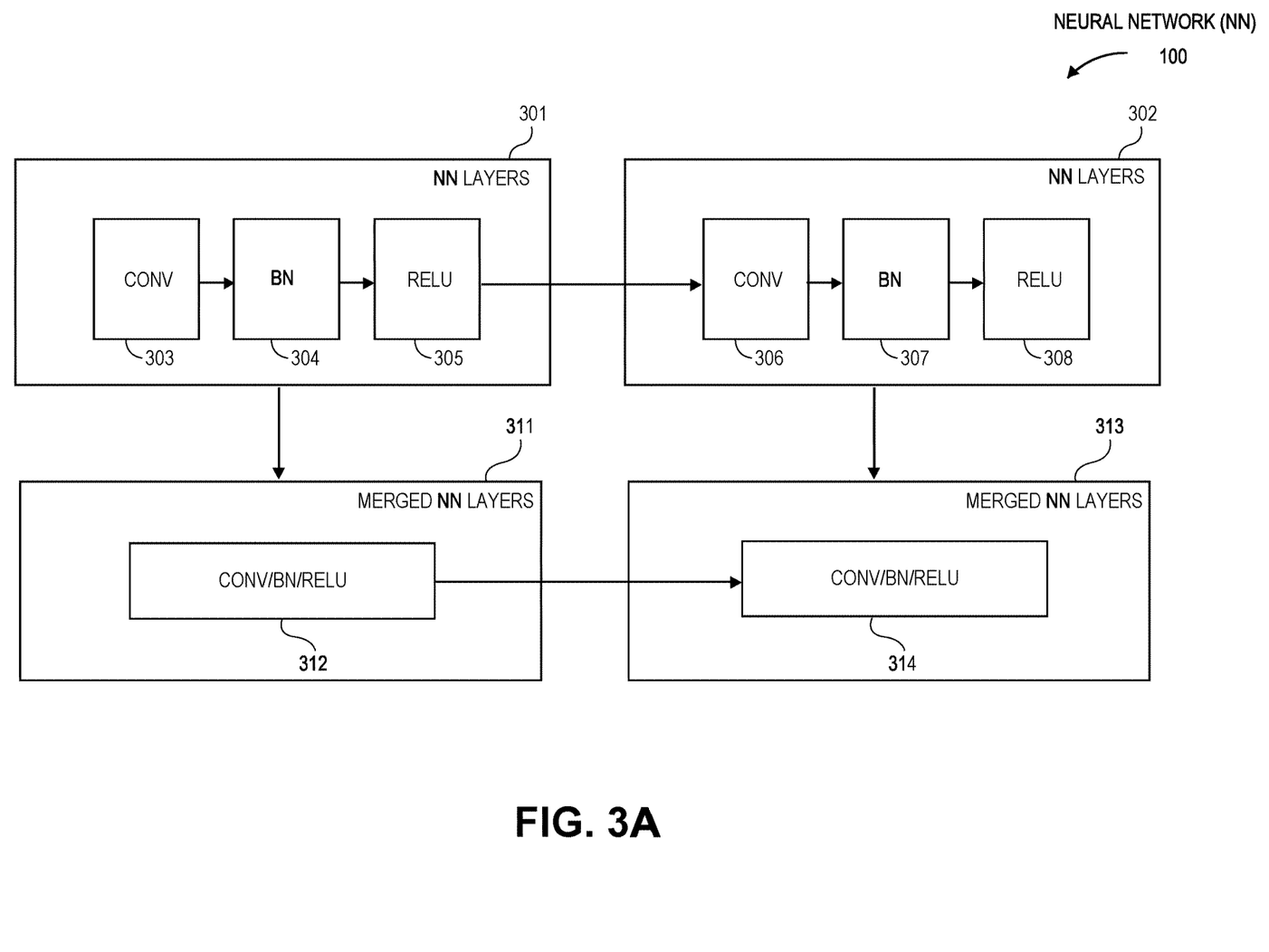
FIG. 3A illustrates one example diagram of merged convolution, batch normalize and rectified linear unit layers for a NN.

FIG. 3A illustrates one example diagram of merged convolution, batch normalize and rectified linear unit layers for a NN 100. Referring to FIG. 3A, NN 100 can have a sequence of NN layers 301 and 302 which can be repeating. NN layers 301 includes convolutional (CONV) layer 303, batch normalize (batch normal) layer 304, and rectified linear unit (RELU) layer 305. NN layers 302 also includes a CONV layer 306, batch normal layer 307, and RELU layer 308. For one example, NN 100 can have these layers merged as shown in merged NN layers 311 and 313. Merged NN layer 311 includes a merged CONV/BN/RELU layer 312 that combines parameters and functions to implement computations for CONV, BN and RELU together as detailed below. Likewise, merged NN layer 313 includes a merged CONV/BN/RELU layer 314 that combines parameters and functions to implement computations for CONV, BN and RELU together as detailed below. The number of repeating merged layers 311 and 313 can vary depending on the NN 100 and its training.

Referring to FIG. 3A, the merged NN layers 311 and 313 can accelerate NN inference performance for NN 100 by using in-place memory operation when computations are performed together. In this way, the NN can eliminate a separate BN layer inference implementation in an AI NN library. For one example, as explained in more detail below, to accelerate BN group layers in a NN for an AI engine, the BN layer is merged with the CONV layer in which weights are quantize into 8-bit format and 32-bits for bias and offsets to meet both performance and accuracy for implementing CONV and BN layer functions.

Training and Optimization for Obtaining Merged Layer Parameters

Figure 3B:
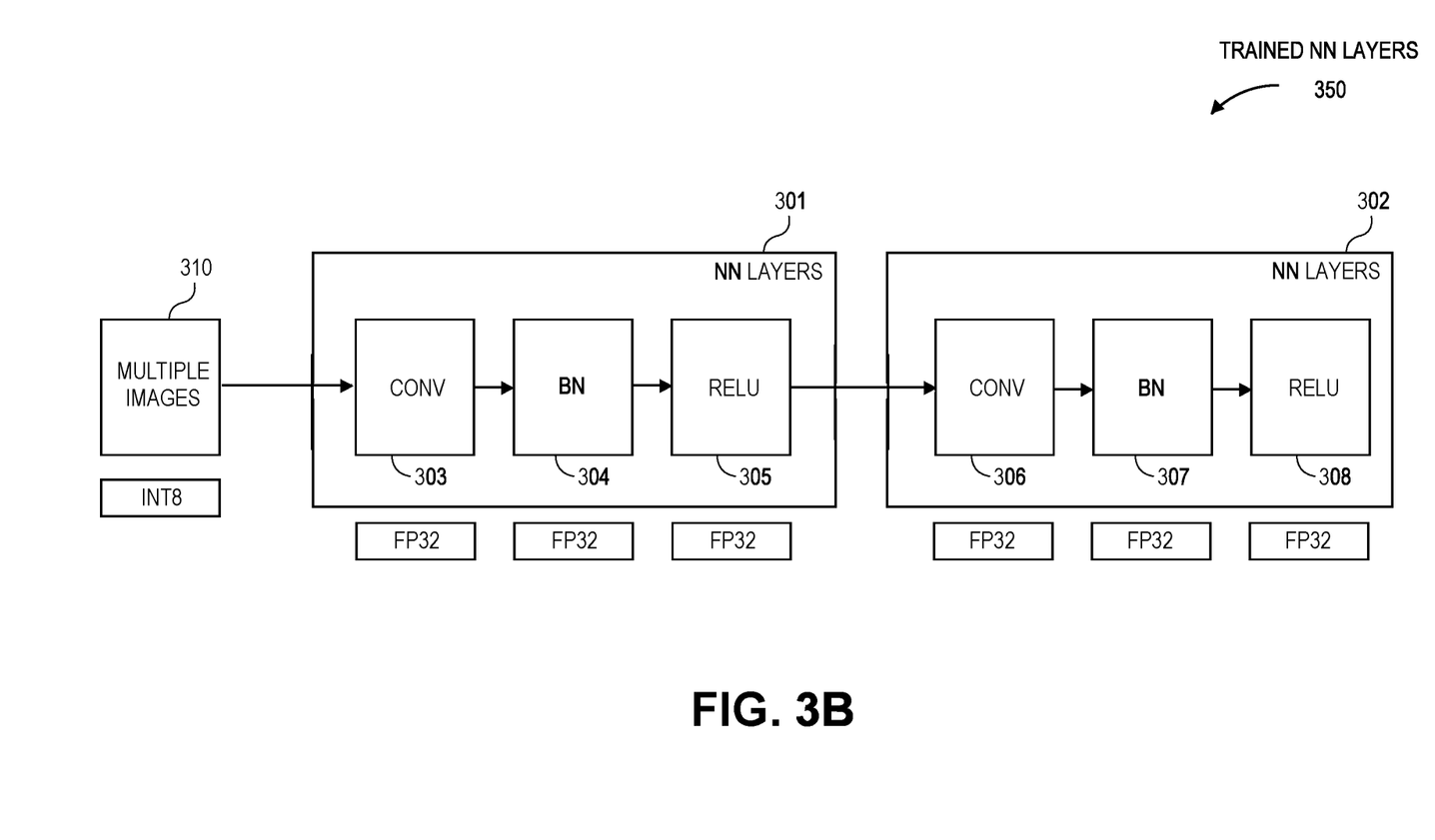
FIG. 3B illustrates one example diagram of NN layers for training and optimization to obtain parameters for merging NN layers.

FIG. 3B illustrates one example diagram of trained NN layers 350 to obtain parameters for merging NN layers. In this example, trained NN layers 350 includes NN layers 301 and 302 having respective CONV, Batch Normal (BN) and RELU layers (303, 306), (304, 307) and (305, 308). Multiple images 310 are used for training and optimization and can have an 8-bit integer format (INT8). For training purposes, the CONV, Batch Normal and RELU layers (303, 306), (304, 307) and (305, 308) can have a 32-bit floating point format (FP32). For one example, training CONV layers (303, 306) includes specifying a set of activations (e.g., kernel computation outputs $Z_i$) and applying a BN transform to each of them to obtain $Y_i$ according to Equation 5. Thus, any layer that received $Z_i$ receives $Y_i$. For one example, BN layers (304, 308) can be trained using batch gradient descent or stochastic gradient descent or other known batch normalization training methods. RELU layers (305, 308) can apply elementwise activation function such that positive values of $Y_i$ are used for training.

bn_bias and bn_constant Parameters

For merging CONV, BN and RELU layers during training, parameters such as bn_bias and bn_const are computed which will be fused with CONV layer parameters to implement fused CONV and BN functions. In determining bn_bias and bn_const, the batch transform $Y_i$ can be rewritten as shown in Equation 6 below.

$$Y_i = \text{Scale} \times \frac{-\mu}{\sqrt{\sigma^2 + \epsilon}} + \text{Shift} + \frac{Z}{\sqrt{\sigma^2 + \epsilon}} \times \text{Scale} \quad (Y_i \text{ Rewritten}) \qquad \text{Equation 6}$$

And the bn_bias and bn_const can be determined according to Equations 7 and 8 shown below.

$$\text{bn\_bias} = \text{Scale} \times \frac{-\mu}{\sqrt{\sigma^2 + \epsilon}} + \text{Shift} \quad (\text{bn\_bias}) \qquad \text{Equation 7}$$

$$\text{bn\_const} = \frac{\text{Scale}}{\sqrt{\sigma^2 + \epsilon}} \quad (\text{bn\_const}) \qquad \text{Equation 8}$$

The batch mean $\mu$ and batch variance $\sigma$ can be computed using Equations 2 and 3 and Scale and Shift are parameters that apply to batch normalization transform, which are constants that are determined to provide an accurate and optimized NN model. Based on bn_bias and bn_const, the normalized transform $Y_i$ can be described according Equation 9 below with batch normalization bias and constant included.

$$Y_i = bn\_bias + Z_i \times bn\_const \qquad \text{Equation 9 } (Y_i \text{ with bn\_bias+bn\_const})$$

For the above computation using, the bn_bias and bn_const parameters can be based on a FP32 format.

Fusing bn_const and bn_bias to Convolution Weights and Bias

During training of the CONV layers (303, 306), the distribution of the layers kernel computation outputs $Z_j = \Sigma_n^i W_i \times X_i + b$ are obtained to train the weights $W_i$ and biases $b$ for optimization of NN performance. Once the convolution (CONV) parameters $W_i$ and biases b are determined for each layer, these parameters can be fused with the bn_const and bn_bias parameters into a fused kernel computation and batch normalization computation as shown in Equation 10 below.

$$Z_j BN(\text{fused}) = \Sigma_n^i bn\_const \times W_i \times X_i + (b + bn\_bias) \qquad \text{Equation 10 (fused)}$$

In Equation 10, the bn_const is fused with the CONV weight Wi (scale) and the CONV bias is fused with bn_bias (offset) which can provide a fused_scale and fused_offset parameter as shown in Equations 11 and 12 below.

$$\text{fused\_scale} = bn\_const \times W_i \qquad \text{Equation 11 (fused\_scale)}$$

$$\text{fused\_offset} = bn\_bias + b \qquad \text{Equation 12 (fused\_offset)}$$

In Equations 11 and 12, the fused_scale and fused_offset parameters can have a 32-bit integer format for NN inference performance. Once the fused_scale and fused_offset parameters are computed, the fused computation can be rewritten as shown in Equation 13 below.

$$Z_j BN(\text{fused}) = \Sigma_n^i \text{fused\_scale} \times X_i + \text{fused\_offset} \qquad \text{Equation 13 (fused)}$$

The RELU layers (305, 308) can be trained to provide positive values for the fused computation of the convolutional kernel computation and batch normalization using the fused_scale and fused_offset parameters.

Figure 4:
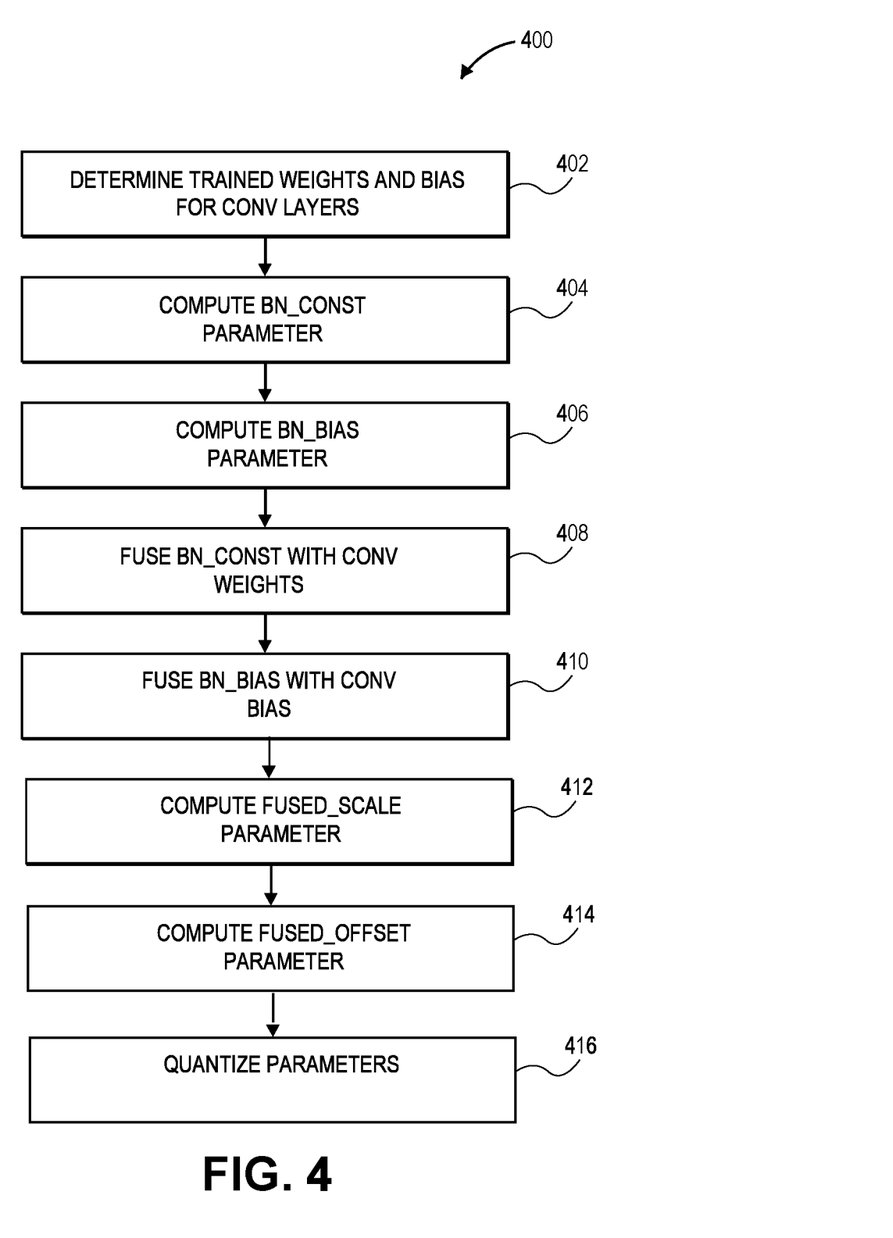
FIG. 4 illustrates one example flow diagram of an operation to obtain fused parameters for merged NN layers.

FIG. 4 illustrates one example flow diagram of an operation 400 to obtain fused parameters for merged NN layers (e.g., CONV, BN and RELU layers 301 and 302) during training of a NN (e.g., NN 100). Operation 400 includes blocks 402 to 414.

At block 402, trained weights and biases of the convolutional layers in the NN are determined. For example, the weights and biases in Equation 1 can be trained for NN.

At block 404, bn_const parameter is computed. For example, the bn_const parameter can be computed according to Equation 8.

At block 406, bn_bias parameter is computed. For example, the bn_bias parameter can be computed according to Equation 7.

At block 408, the bn_const is fused with convolution layer weights. For example, the bn_const parameter can be fused with convolution layer weights according to Equation 10 as bn_const×$W_i$.

At block 410, the bn_bias is fused with convolution layer bias. For example, the bn_bias parameter can be fused with the convolution layer bias according to Equation 10 as bn_bias+b.

At block 412, the fused_scale parameter is computed. For example, the fused_scale parameter can be computed according to Equation 11.

At block 414, the fused_offset parameter is computed. For example, the fused_offset parameter can be computed according to Equation 12. Once the fused_scale and fused_offset parameters are computed, the fused kernel computation $Z_i$ and batch normalization (BN) can be used according to Equation 13 during NN inference performance.

At block 415, parameters are quantized. For one example, convolution layer weights and biases and bn_const and bn_bias can be quantized for an 8-bit integer format, which can easily be processed by 8-bit multiply accumulate units (MACs) in a NN AI engine. In generating the fused_scale and fused_offset parameters, the parameters can be quantized into a 32-bit integer format. Quantization can be based on the NN architecture or AI engine used for inference performance. For one example, quantization is implemented per channel and each channel can be quantized independently. The fused parameters can be stored as metadata in a metafile and retrieved later for training or inference performance.

Merged Layers Inference Performance

Figure 5:
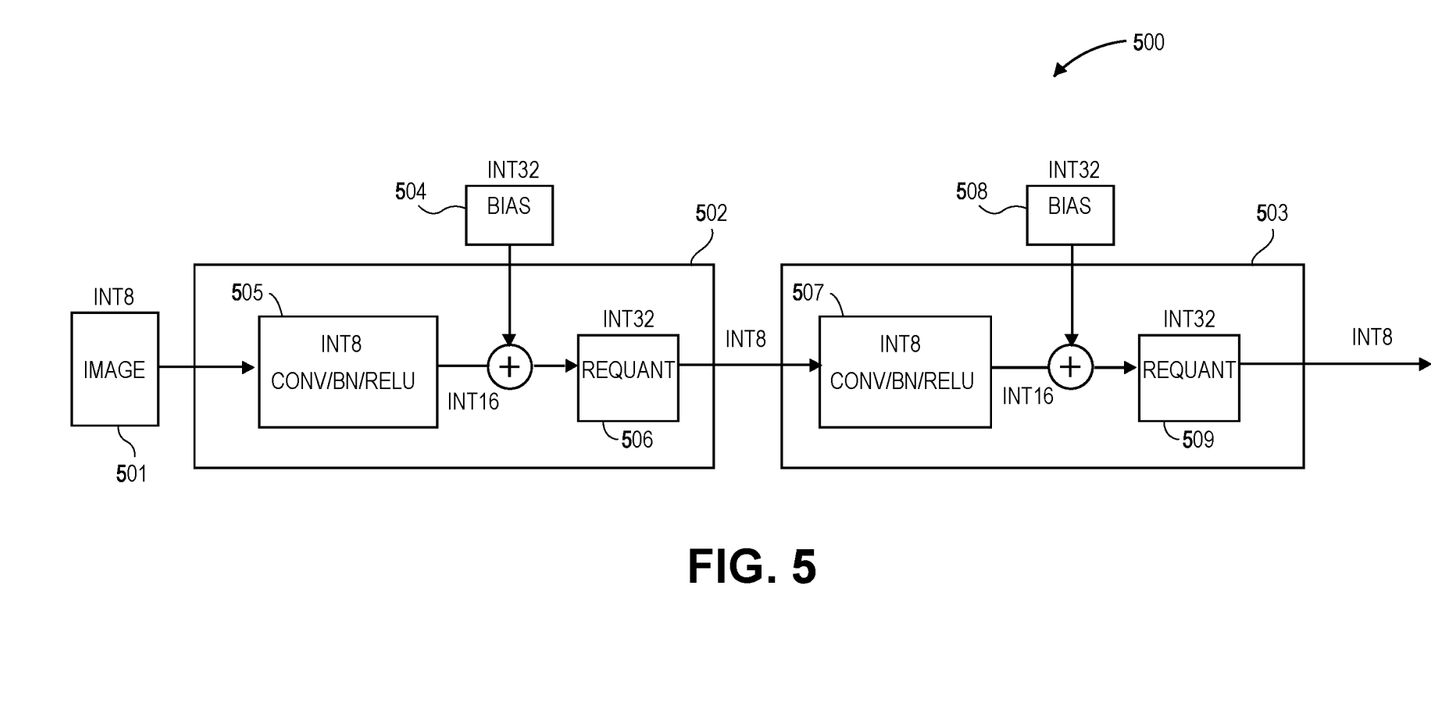
FIG. 5 illustrates one example of merged NN layers of a NN implementing inference performance using fused parameters.

FIG. 5 illustrates one example of merged NN layers 502 and 503 of a NN 500 implementing inference performance using fused parameters. NN layer 502 includes merged CONV/BN/RELU layer 505 and NN layer 503 includes merged CONV/BN/RELU layer 507. Input data such as image 501 is fed into merged CONV/BN/RELU layer 505 that can perform merged computations using parameters in 8-bit integer format such as detailed above in Equation 13. For example, the merged layer 505 can compute fused_scale×$X_i$ in which the parameters are in an 8-bit integer format and whose output can be a 16-bit integer. The bias portion 504 (or offset) such as fused_offset can be in a 32-bit integer format and added to the merged kernel computation and batch normalization in a 16-bit integer format. The RELU portion of the merged layer 505 can provide a positive integer. The requantization (requant) block 506 can quantize the result into an 8-bit integer format and fed into a subsequent NN layer 503 and, in particular, to merged CONV/BN/RELU layer 507. At NN layer 503, the CONV/BN/RELU 507, bias portion 508, and requant block 509 can operate in the same way as in NN layer 502.

For the example of FIG. 5, the image 501 or feature map, fused parameters (e.g., fused_scale and fused_offset), and kernel values $X_i$ of the feature map can be in a matrix and tensor format. For one example, a multiply accumulate (MAC) engine can compute values VAL(INT16)=fused parameters FM(INT8)×kernel parameters Kernel(INT8). The MAC engines can then generate Values=VAL(INT16)+BIAS(INT32) and a RELU engine can generate positive values RELU(VAL). After a merged layer performs merged computations as disclosed herein, an engine in the NN can generate a next layer feature map for subsequent merged layers=fused_scale×(val−fused_offset).

Exemplary Hardware for Implementing Merged Layers

Figure 6:
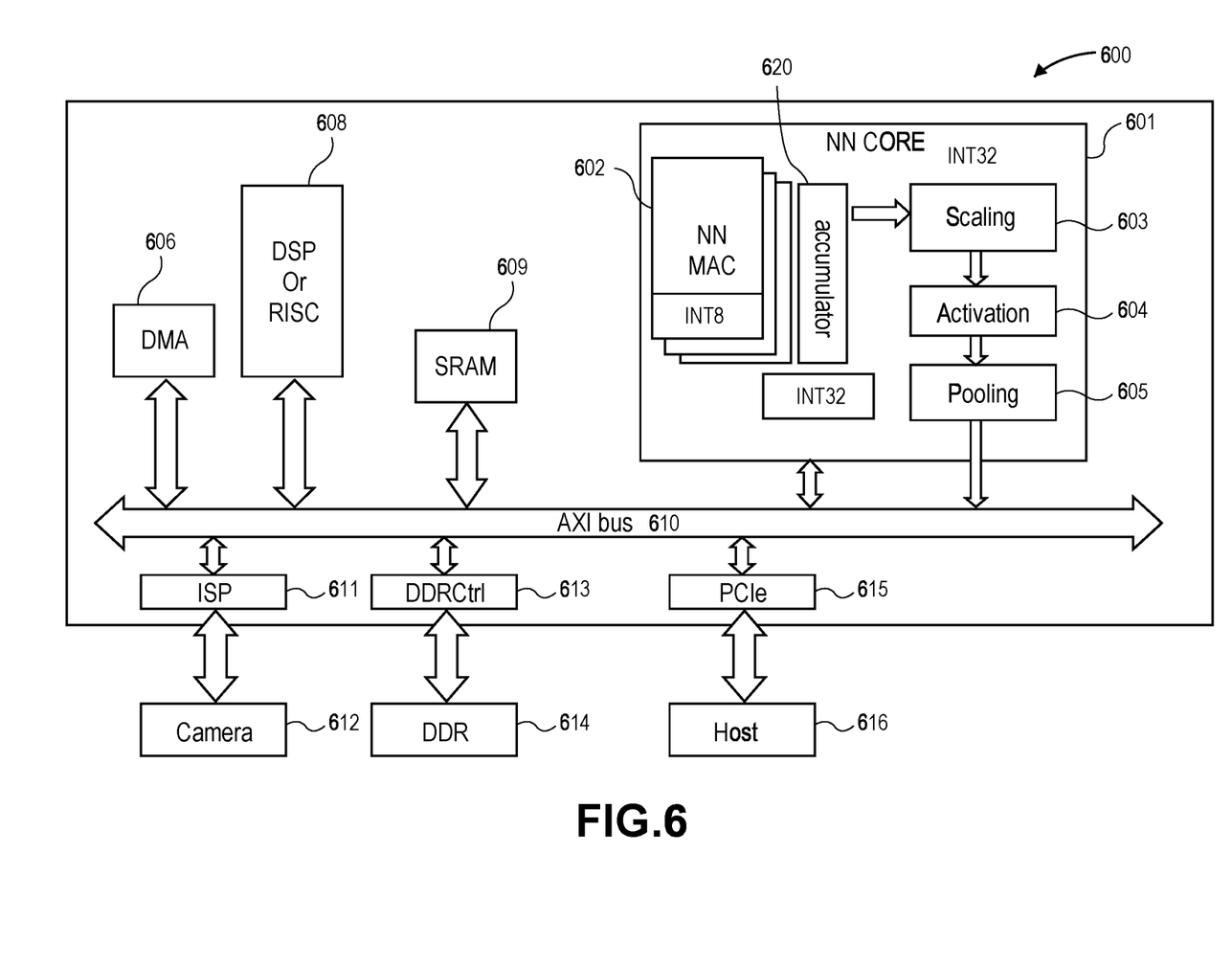
FIG. 6 illustrates one example block diagram of a NN system having a NN core to implement merged NN layer functions.

FIG. 6 illustrates one example block diagram of a NN system 600, which can be a data processing system, computing system or AI engine. NN system 600 includes a NN core 601. NN core 601 includes a plurality of NN multiply accumulate units (MACs) 602 and processing blocks for scaling 603, activation 604 and pooling 605. NN MACs 602 and accumulator 620 can be used to compute computations as described in the equations of the above examples including merged BN and CONV kernel computation functions. The outputs of accumulator 620 can be scaled at scaling block 603. After scaling, activation data is generated for a NN layer at activation block 604. The activation data 604 can be pooled by pooling block 605 that aggregates information within each small region of input feature maps or channel and can down sample the results. The pooling block 605 can be coupled to the host 616 by way of the peripheral component interconnect express (PCIe) interface 615 and other components of the NN system 600 by way of advanced extensible interface (AXI) bus 610.

For one example, the output results or interim results of NN core 601 can be stored in memory such as static random-access (SRAM) memory 609 or double data rate (DDR) memory 614 which can be a DDR synchronous dynamic random-access memory (SDRAM) having a DDR controller (DDRCtrl) 613 controlling memory access and data transfer to and from DDR memory 614. The output results of the NN core 601 can be processed by digital signal processor (DSP) or reduced instruction set control (RISC) processor 608 for classification of input data such as images. DSP or RISC processor 608 can also implement program code, firmware or software for implementing the merged NN layer techniques described herein. Input data or images can be obtained from a camera 612 coupled to an image signal processor 611 within NN system 600. Image data from ISP 611 can be stored in DDR 614 or SRAM 609 or both for processing by the NN core 601 for NN inference performance to classify the input data. For one example, DSP or RISC processor 608 can be used to implement operations disclosed herein or for classifying the output of NN layers in the above examples.

Figure 7:
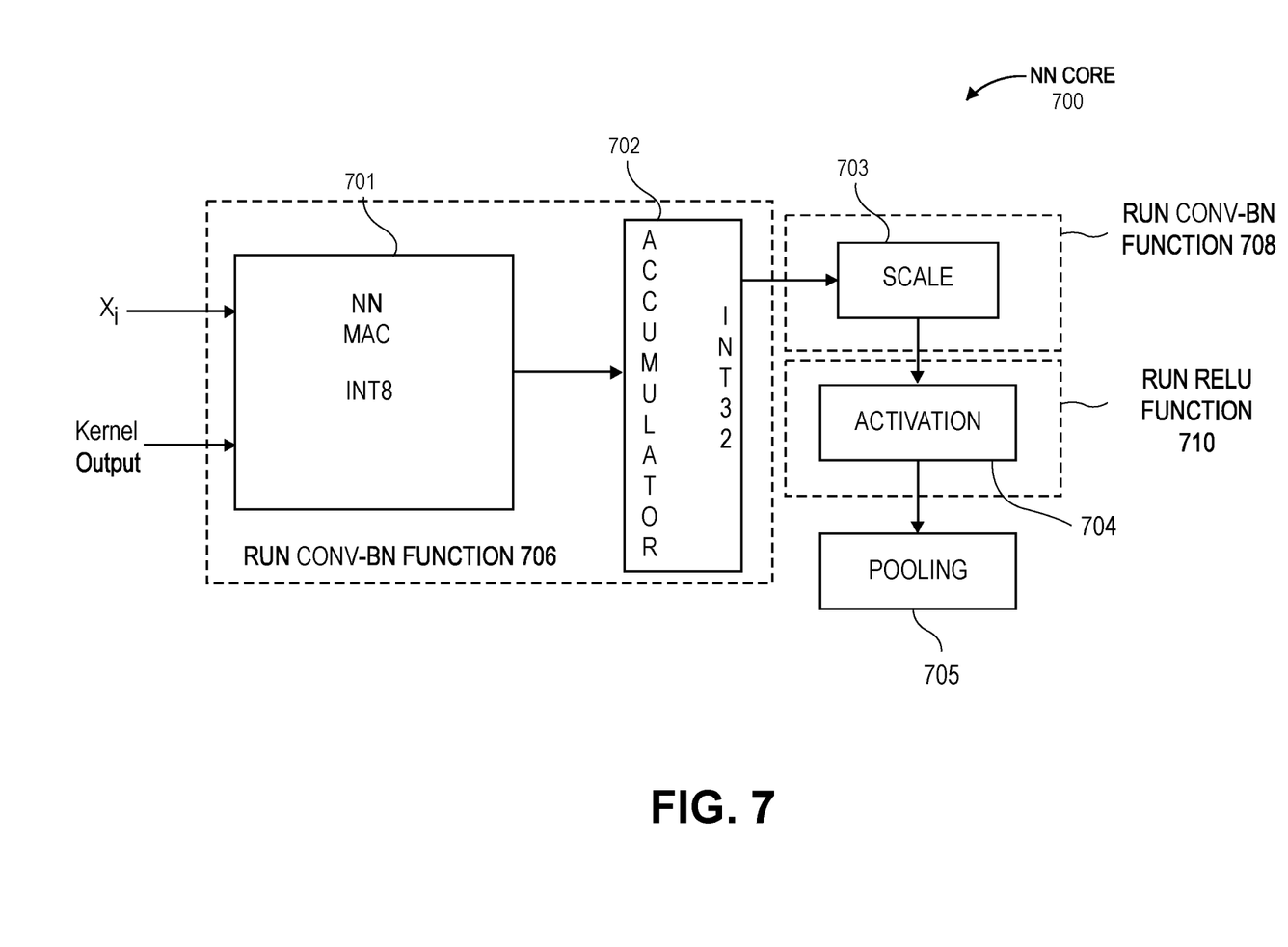
FIG. 7 illustrates one example block diagram of a NN core to implement merged NN layer functions.

FIG. 7 illustrates one example block diagram of a NN core 700 to implement merged NN layer functions. The NN core 700 is shown with a NN MAC 701 and accumulator 702 that is running merged CONV-BN functions 706. The NN MAC 701 receives inputs $X_i$ in the first instance when implementing the NN on one or more feature maps or kernel outputs $Z_i$ from a previous layer that requires merged CONV-BN functions. The NN MAC 701 and accumulator 702 can compute the merged CONV-BN function according to Equations 10 and 13 to generate $Z_i$BN(fused). The CONV-BN functions can continue in CONV-BN functions 708 in the scale block 703 that scales the generated output, e.g., from 32-bit format to a 64-bit format which can be stored in a 64-bit memory. The run RELU function 710 can run an elementwise activation function to provide positive values for the scaled output.

Figure 8:
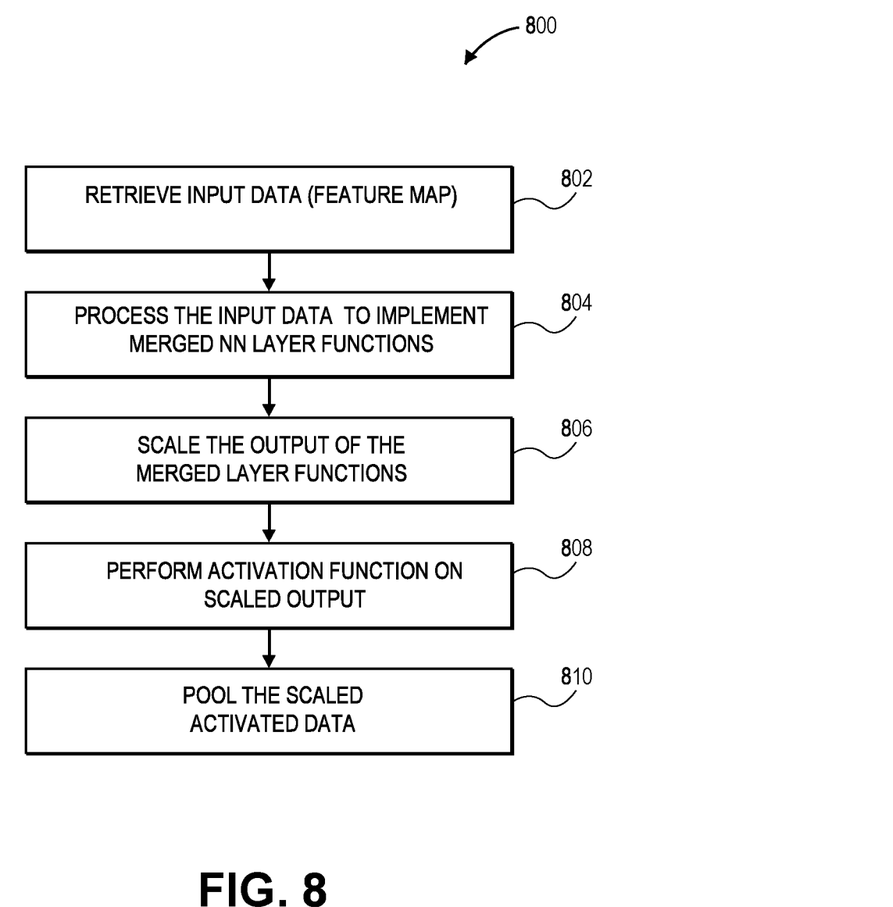
FIG. 8 illustrates one example flow diagram of an operation to implement merged NN layers in a NN.

FIG. 8 illustrates one example flow diagram of an operation 800 to implement merged NN layers in a NN. Operation 800 includes blocks 802 to 810 and can be implemented by NN system 600 and NN core 700 as descried in FIGS. 6-7.

At block 802, input data, e.g., a feature map, is retrieved.

At block 804, the input data is processed to implement merged NN layer functions. For one example, the merged NN layer functions include merged batch normalization (BN) transform function with the convolutional (CONV) kernel computation function using merged BN and CONV parameters as described in Equations 1-13 to generate the fused output $Z_i$BN(fused).

At block 806, the output of the merged layer functions is scaled. For example, the $Z_i$BN(fused) output can be scaled.

At block 808, an activation function is performed on the scaled output, e.g., the scaled fused output. For example, a RELU activation function can be performed to obtain positive values.

At block 810, the scaled activated data is pooled. For example, pooling can aggregate the information regarding the data of the input feature map data. The pooled data can then be used by subsequent NN layers or stored in the NN system.

In the foregoing specification, the invention has been described with reference to specific exemplary embodiments and examples thereof. It will, however, be evident that various modifications and changes may be made thereto without departing from the broader spirit and scope of disclosed embodiments and examples. The specification and drawings are, accordingly, to be regarded in an illustrative rather than a restrictive sense.

What is claimed is:

1. A method for training a neural network (NN), the method comprising:
   for each of a plurality of NN layers of the NN,
      merging batch normalization (BN) layer parameters with convolutional (CONV) layer parameters, wherein the BN layer parameters are associated with a BN layer of a corresponding NN layer and the NN layer parameters are associated with a CONV layer of the corresponding NN layer;
      forming a merged BN and CONV (BN/CONV) layer to compute merged BN layer and CONV layer functions using the merged BN and CONV layer parameters; and
      merging a rectified linear unit (RELU) layer function with the merged BN layer and CNN layer functions to form a merged BN/CONV/RELU layer.

2. The method of claim 1, further comprising:
   merging a batch normalization transform function with a convolutional kernel computation function.

3. The method of claim 2, wherein computing the merged BN layer and NN layer functions includes computing the merged batch normalization transform function and convolutional kernel computation function.

4. The method of claim 2, wherein merging BN layer parameters with CONV layer parameters includes merging a batch normalization constant with weights of the convolutional kernel computation function.

5. The method of claim 2, wherein merging BN layer parameters with CONV layer parameters includes merging batch normalization bias with a bias of the convolutional kernel computation function.

6. The method of claim 1, further comprising storing the merged BN and CONV layer parameters as metadata in a metafile, which can be utilized subsequently by the merged BN/CONV layer during inference.

7. A non-transitory machine-readable medium having instructions stored therein, which when executed by a processor, cause the processor to perform operations for training a neural network (NN), the operations comprising:
   for each of a plurality of NN layers of the NN,
      merging batch normalization (BN) layer parameters with convolutional (CONV) layer parameters, wherein the BN layer parameters are associated with a BN layer of a corresponding NN layer and the NN layer parameters are associated with a CONV layer of the corresponding NN layer; and
      forming a merged BN and CONV (BN/CONV) layer to compute merged BN layer and CONV layer functions using the merged BN and CONV layer parameters; and
      merging a rectified linear unit (RELU) layer function with the merged BN layer and CNN layer functions to form a merged BN/CONV/RELU layer.

8. The machine-readable medium of claim 7, wherein the operations further comprise:
   merging a batch normalization transform function with a convolutional kernel computation function.

9. The machine-readable medium of claim 8, wherein computing the merged BN layer and NN layer functions includes computing the merged batch normalization transform function and convolutional kernel computation function.

10. The machine-readable medium of claim 8, wherein merging BN layer parameters with CONV layer parameters includes merging a batch normalization constant with weights of the convolutional kernel computation function.

11. The machine-readable medium of claim 8, wherein merging BN layer parameters with CONV layer parameters includes merging batch normalization bias with a bias of the convolutional kernel computation function.

12. The machine-readable medium of claim 7, wherein the operations further comprise storing the merged BN and CONV layer parameters as metadata in a metafile, which can be utilized subsequently by the merged BN/CONV layer during inference.

13. A data processor, comprising:
   one or more memories to receive and store input data; and
   a processing core coupled to the one or more memories to classify the input data using a neural network (NN) having a plurality of NN layers, wherein each of the NN layers includes a merged batch normalization (BN) transform and convolutional (CONV) kernel computation layer using a set of merged BN and CONV parameters, wherein the processor core is to
      for each of a plurality of NN layers of the NN,
         form the merged BN transform and CONV kernel computation layer to compute merged BN layer and CONV layer functions using the set of merged BN and CONV parameters; and
         merge a rectified linear unit (RELU) layer function with the merged BN layer and CNN layer functions to form a merged BN/CONV/RELU layer.

14. The data processor of claim 13, wherein the one or more memories store the merged BN and CONV parameters.

15. The data processor of claim 13, wherein the processing core is configured to compute merged BN transform and CONV kernel computation functions.

16. The data processor of claim 15, wherein the merged BN and CONV parameters include a merged BN constant with weights of a CONV kernel computation.

17. The data processor of claim 13, wherein the merged BN and CONV parameters include a merged BN bias with a bias of a CONV kernel computation.

18. The data processor of claim 13, wherein the processing core is trained to implement the NN with merged BN transform, CONV kernel computation, and rectified linear unit (RELU) layers.

* * * * *